Figure 1:
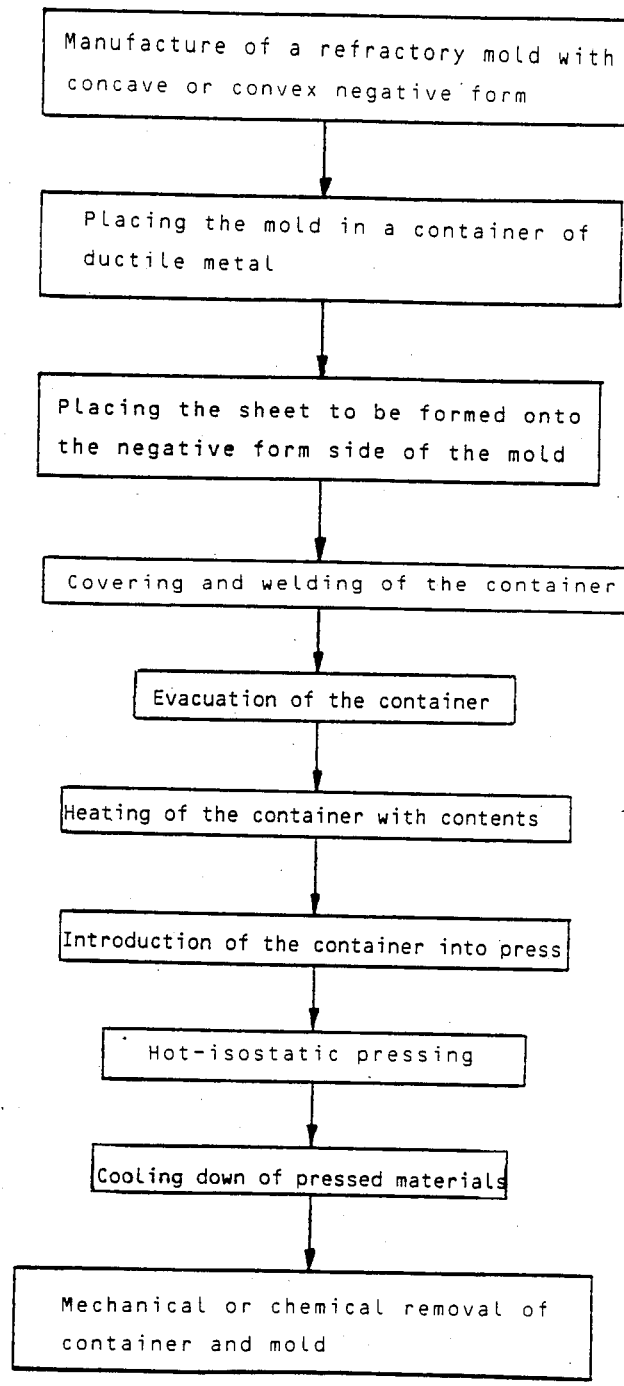

United States Patent [19]

Meyer et al.

[11] Patent Number: 4,706,361

[45] Date of Patent: Nov. 17, 1987

[54] PROCESS FOR THE HOT-FORMING OF AT LEAST ONE SHEET MADE OF A MATERIAL THAT IS DIFFICULT TO WORK

[75] Inventors: Gundolf Meyer, Birmenstorf; Clemeens Verpoort, Fislisbach, both of Switzerland

[73] Assignee: BBC Brown, Boveri & Company, Ltd., Baden, Switzerland

[21] Appl. No.: 828,707

[22] Filed: Feb. 12, 1986

[30] Foreign Application Priority Data

Feb. 21, 1985 [CH] Switzerland .......................... 795/85

[51] Int. Cl.⁴ .............................................. B23P 17/04
[52] U.S. Cl. ........................................ 29/423; 77/379
[58] Field of Search .................. 29/423, 424, 455 LM; 72/60, 63, 379, 700

[56] References Cited

U.S. PATENT DOCUMENTS

| | | | |
|---|---|---|---|
| 3,068,565 | 12/1962 | King et al. | 29/455 LM |
| 3,071,853 | 1/1963 | Price et al. | 29/455 LM |
| 3,739,617 | 6/1973 | Stejskal | 72/63 |
| 4,117,970 | 10/1978 | Hamilton et al. | 72/63 |
| 4,333,216 | 6/1982 | Slaughter | 29/455 LM |
| 4,559,797 | 12/1985 | Raymond | 72/63 |

Primary Examiner—P. W. Echols
Attorney, Agent, or Firm—Oblon, Fisher, Spivak, McClelland & Maier

[57] ABSTRACT

Process for the hot forming of sheets (5) made of a material that is difficult to work, especially of a dispersion-hardened high-temperature alloy by hot-isostatic pressing in one operation against the contour of a mold (1) serving as negative form in a container (2) that is under vacuum (6) and closed by a cover (3) with welding seam (4). In addition, joining of several sheets (5) to form one body (9) of complicated shape by the diffusion bonding process at the end of the hot-isostatic pressing in one heat in the same single operation.

8 Claims, 8 Drawing Figures

PROCESS FOR THE HOT-FORMING OF AT LEAST ONE SHEET MADE OF A MATERIAL THAT IS DIFFICULT TO WORK

The invention is based on a process for the hot-forming of at least one sheet made of a material that is difficult to work, according to the preamble of claim 1.

The technique of forming metal bodies has developed in recent times to an industrial-economically significant branch of manufacturing technology (cf. e.g. K. Lange, Th. Neitzert, H. Westheidl, Moglichkeiten moderner Umformtechnik [Possibilities in modern forming technology], Zeitschrift fur industrielle Fertigung 73, Springer Verlag 1983, pages 349–358). When forming materials that are difficult to work, especially when forming sheets, special forming conditions must be observed. This frequently involves making use of the property of certain materials to show a superplastic behavior under specific conditions (cf. P. J. Winkler, W. Keinath, Superplastische Umformung, ein werkstoffsparendes und kostengunstiges Fertigungsverfahren fur die Luft- und Raumfahrt [Superplastic forming, a material-saving and inexpensive fabrication process for aircraft and spacecraft], Metall, issue 6, volume 34, 1980, pages 519 ff). In the case of materials that are difficult to work, in particular in the case of high-temperature materials, particularly great difficulties occur because of the necessary high forming temperatures and the risk of oxidation and cracking. This applies inter alia in the case of superalloys, especially of oxide dispersion-hardened superalloys, of molybdenum, of ceramic plates etc.

Hot-isostatic pressing is also known from the technology. It is applied to an increasing extent quite generally in powder metallurgy, particularly for refractory alloys (cf. G. H. Gessinger, Powder Metallurgy of Superalloys, Butterworths 1984, University Press Cambridge, in particular section 3.2.2. HIP, pages 70 et seq.). Apart from being used for powder compaction in the manufacture of compact bodies, the hot-isostatic pressing method is also used with good results for a number of other manufacturing processes. Among others this includes the diffusion bonding of components by hot-isostatic pressing (cf. Ch. Nissel, HIP Diffusion Bonding, Powder metallurgy international vol. 16, No. 3, 1984, p. 113 ff; W. Werdecker, F. Aldinger, Joining of refractory metals by HIP Technology, R & HM March 1982, "Trends in Refractory Metals, Hard Metals and Special Materials and Their Technology", Vol. 2, 10th Plansee Seminar, Reutte, Austria, 1st–5th June 1981, pages 161–193). There are numerous publications on isostatic pressing generally (e.g. D. Ermel, Isostatisches Pressen und seine Anwendungsmoglichkeiten [Isostatic pressing and its possible applications], Sprechsaal, Vol. 116, No. 3, 1983, pages 170–177).

The conventional sheet metal forming techniques with presses, dies and molds usually fail with materials that are very difficult to form or several operations are needed in succession. The higher the forming temperature and the more complicated the shape of the workpiece is, the less economical this process becomes.

There is therefore a great need to improve and to rationalize the forming of sheets of materials that are difficult to work.

The object of the invention is to specify a process for the hot forming of sheets made of a material that is difficult to work, in particular of an oxide dispersion-hardened superalloy, which permits comparatively high temperatures to be used and which is economically suitable for industrial large-scale and mass production even of complicated workpiece shapes.

This object is achieved by the features indicated in the characterizing clause of claim 1.

The invention will now be described with the help of the following exemplary embodiments, which are explained more closely by Figures.

Figure 2:
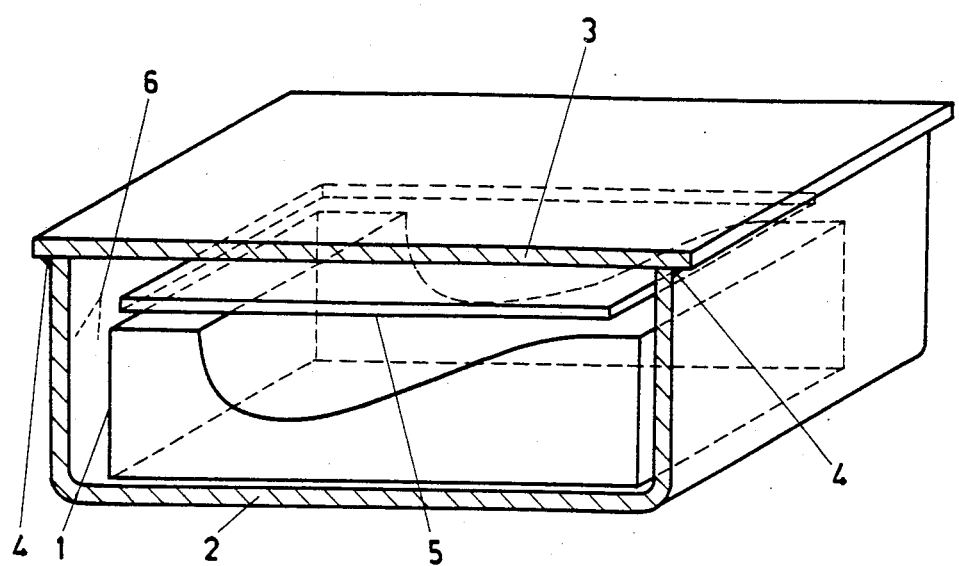
Figure 3:
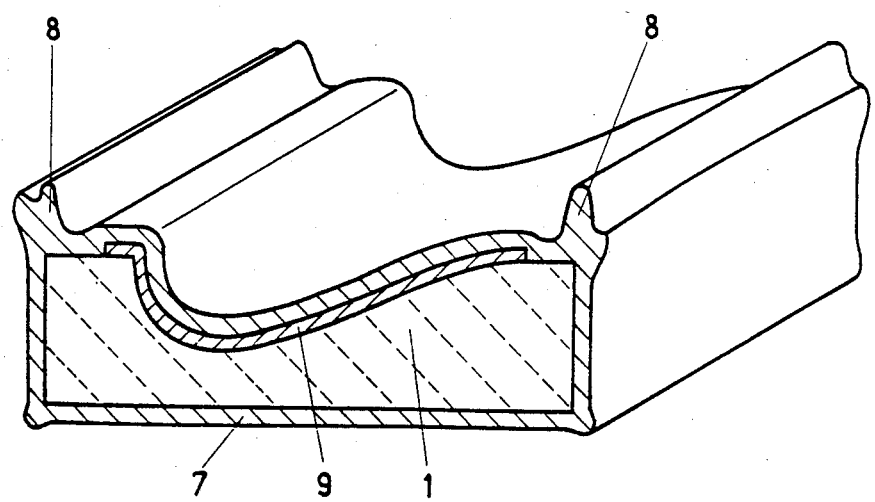
Figure 4:
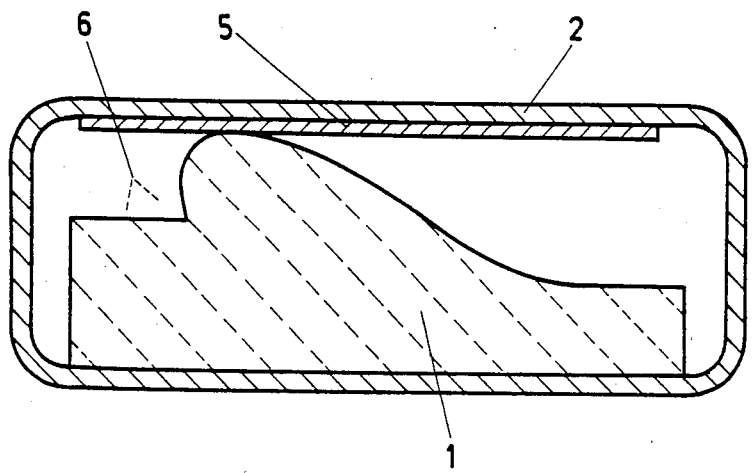
Figure 5:
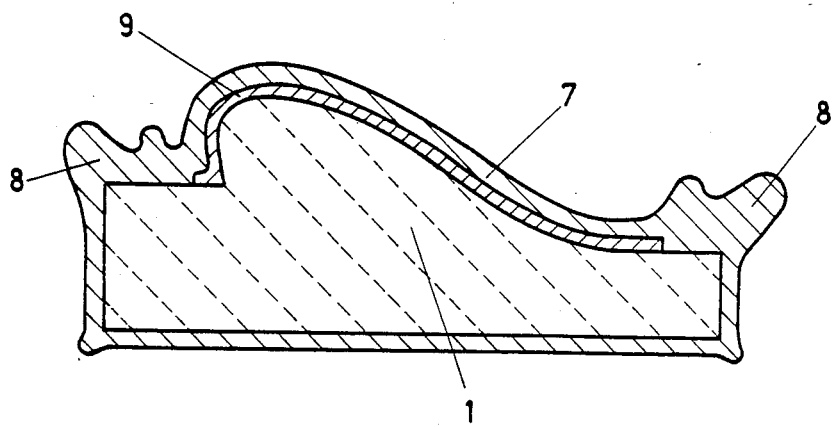
Figure 6:
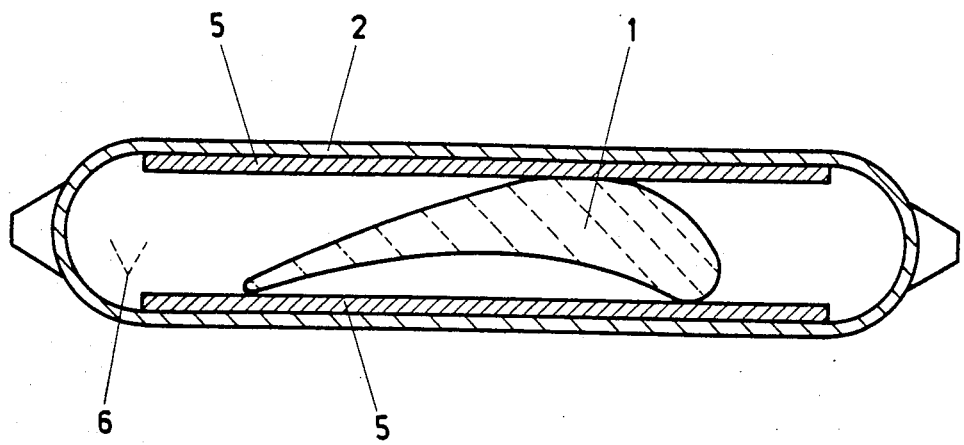
Figure 7:
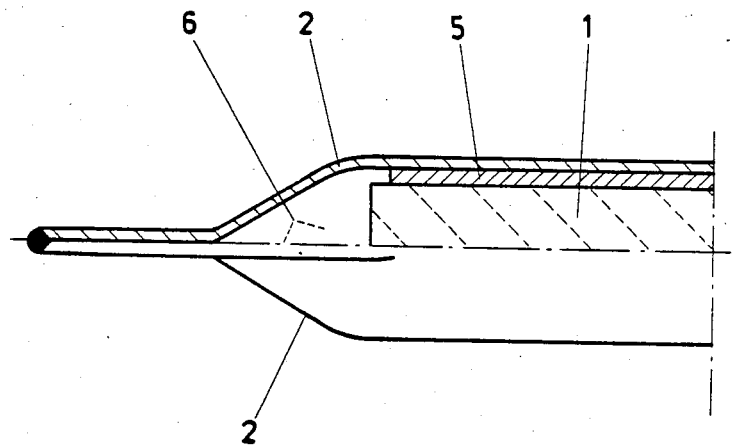
Figure 8:
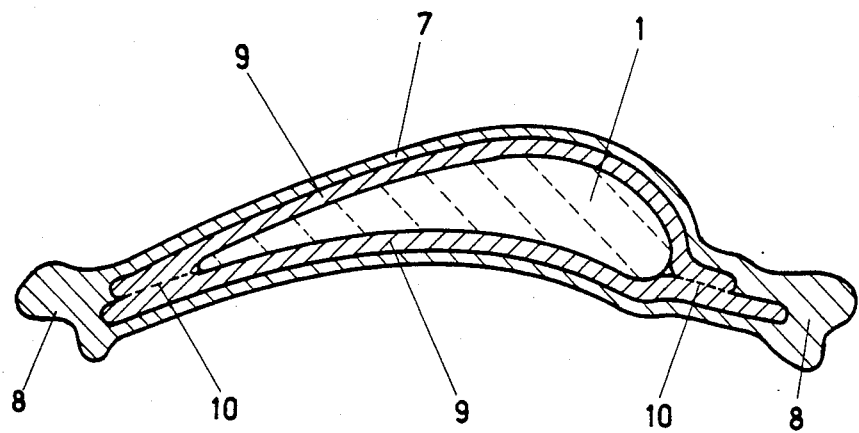

FIG. 1 shows a flow chart of the process in the form of a block diagram,

FIG. 2 shows a perspective representation/vertical section of tool and workpiece before forming, FIG. 3 shows a perspective representation/vertical section of tool and workpiece after forming, FIG. 4 shows a vertical section (cross section) through another form of tool and workpiece before forming, FIG. 5 shows a vertical section (cross section) through another form of tool and workpiece after forming, FIG. 6 shows a vertical section (cross section) through a tool and workpieces to be joined, before forming, FIG. 7 shows a side elevation/longitudinal section of a tool and workpieces to be joined before forming, FIG. 8 shows a vertical section (cross section) through a tool and joined workpieces after forming.

FIG. 1 relates to a flow chart of the process for the hot forming of a workpiece in the form of a block diagram. The Figure requires no further explanation.

In FIG. 2 a tool and workpiece are shown before forming, partly in perspective and partly as a vertical section. 1 is a mold for the workpiece to be formed that is made in prismatic form in the lower part and as a concave negative form in the upper part. The mold 1 may be made of a metal or ceramic high-temperature material. 2 is a container in the original condition (before forming) comprising a ductile metal material whose melting point is high enough not to start to melt at the forming temperature. In this particular case the container 2 is made preferably from a soft carbon steel. A cover 3 seals the container 2 hermetically and vacuum-tight by means of a welding seam 4. Container 2, cover 3 and welding seam 4 are shown in section at the forward front side (as a vertical section). 5 is the sheet (workpiece before forming) that is to be formed and placed at the side of the negative form of mold 1, and in the present case it is supplied as a flat sheet. The container 2 is evacuated and finally welded after the cover 3 has been welded. The vacuum is indicated by the reference mark 6.

FIG. 3 shows the tool and the workpiece of FIG. 1 after forming, partly as a perspective view and partly (front end) as a vertical section. 1 is the unchanged form of the mold, 7 the formed container with its beads 8 (material accumulation by upsetting effects) after the hot-isostatic pressing. The formed sheet 9 (workpiece after forming) fits snugly at all points against the contours of the negative form of the mold 1.

A vertical section (cross-section) through another form of tool and workpiece before forming is shown in FIG. 4. 1 is the mold provided in the upper part with a convex negative form for the workpiece. The container 2 consists here essentially of a tube of rectangular cross-section that may be squeezed and welded at the face ends (not drawn) or sealed vacuum-tight by welded covers. The other reference marks correspond to those of FIG. 2.

FIG. 5 shows a vertical section (cross-section) through a form of tool and workpiece in accordance with FIG. 4, but after the forming operation. The reference marks correspond to those of FIG. 3.

A vertical section (cross section) through a tool and through the workpieces to be joined is shown in FIG. 6 before the forming operation. The mold 1 has here the form of a complete blade profile and acts as a core as it were. The container 2 consists of a tube that has been pressed flat and squeezed and welded at the face ends. The two sheets 5 that are to be formed and joined in a subsequent phase in the same heat by diffusion-bonding are inserted as workpieces. The vacuum is indicated by the reference mark 6.

FIG. 7 shows a side elevation/longitudinal section of a tool and workpieces to be joined before forming. Only half of the bodies symmetrical with respect to the center line is shown. The lower half shows the sheet-metal bodies in elevation and the upper half shows the various bodies in section. The container 2 made in the form of a flat tube has been squeezed flat at its face ends and sealed by a welding seam. All reference marks correspond to those of FIG. 6.

FIG. 8 relates to a vertical section (cross-section) through the tool and the workpieces to be joined, in accordance with FIG. 6, but after the forming operation. By means of the hot-isostatic pressing operation, the formed sheets 9 contacted the contours of the mold 1 acting as core and enclosed it completely. In the same heat the ends of the sheets 9 were firmly joined together by diffusion-bonding. The virtual bonding surfaces 10 that later were no longer recognisable crystallographically are indicated by broken lines. The upset material of the container 7 forms the bead 8 after the hot-isostatic pressing operation. The longitudinal section of the bodies after forming remains substantially unchanged and corresponds approximately to FIG. 7, for which reason it has not been shown again.

Exemplary embodiment I:
See FIGS. 2 and 3:

One of the blade half-shells corresponding to the convex blade side was made by hot-forming from a refractory coarse-grained sheet 5 from an oxide dispersion-hardened nickel base superalloy. The material with the trade name MA 6000 (International Nickel Co.) had the following composition Ni ≈ 69 % by weight
Cr = 15 % by weight
W = 4.0 % by weight
Mo = 2.0 % by weight
Al = 4.5 % by weight
Ti = 2.5 % by weight
Ta = 2.0 % by weight
C = 0.05 % by weight
B = 0.01 % by weight
Zr = 0.15 % by weight
$Y_2O_3$ = 1.1 % by weight The dimensions of the sheet 5 which had fringe crystals elongated longitudinally were as follows:
Length = 280 mm
Width = 110 mm
Thickness = 2.5 mm A mold 1 containing the negative form of the single-sided blade profile as a concave surface was made from a refractory ceramic material. A container 2 was made with a wall thickness of 2 mm from low-carbon soft steel with less than 0.1% C content. The sheet 5 to be formed, the mold 1 and the inside of the container 2 were then coated with an anti-wetting agent/separating agent. In the present case $Al_2O_3$ was applied to the surfaces by plasmaspraying. The mold 1 was then put into the container 2, the sheet 5 to be formed was placed on it flat and the whole was covered with a cover 3 made of the same carbon steel as the container 2. The cover 3 was then joined with the container 2 all round by a vacuum-tight welding seam 4, evacuated, and the passage that had remained open for exhausting the air was finally closed by electron beam welding.

The whole was then heated to a press temperature that was above the recrystallization temperature of the superalloy in the case under consideration, to 1275° C.—introduced into a press and formed over a period of 2 hours under a pressure of 150 MPa by hot-isostatic pressing (reference mark 9, FIG. 3). After the forming operation the sheet 9 had the form of a blade half-shell with the following inside dimensions:
Width = 75 mm
Depth = 15 mm After forming, the container 7 was removed by mechanical means by opening up the welding seams, bending over and removing the container walls and grinding away the remainders. The mold 1 can then generally be reused.

Exemplary embodiments II:
See FIGS. 6, 7 and 8:

The hollow blade was made from two refractory coarse-grained sheets 5 of an oxide dispersion-hardened nickel base superalloy by hot-forming and diffusion bonding in one heat. The material with the trade designation MA 754 (International Nickel Co.) had the following composition:

Ni ≈ 78 % by weight
Cr = 20 % by weight
C = 0.05 % by weight
Al = 0.3 % by weight
Ti = 0.5 % by weight
Fe = 1.0 % by weight
$Y_2O_3$ = 1.0 % by weight The dimensions of the sheets 5 which had fringe crystals elongated longitudinally were in each case as follows:
Length = 300 mm
Width = 150 mm
Thickness = 2.8 mm The mold 1 representing the inner negative form was made as a core with blade profile (width = 80 mm; depth = 20 mm) and consisted of a refractory high-temperature alloy. The container 2 was produced from a circular tube of corrosion-resistant chrome nickel steel (18% Cr; 8% Ni) with an external diameter of 129 mm and a wall thickness of 2 mm. The circular tube was pressed together to make a flat tube with rounded narrow sides (width = 186 mm; thickness = 30 mm). The sheets 5, the mold 1 and the inside of the container 2 were coated with a separating agent that contained colloidal graphite in water. The sheets 5 and the mold 1 were then pushed axially into the container 2 and the latter was squeezed flat at its face ends, welded, evacuated and finally sealed (vacuum 6).

The container 2 and its contents were brought up to a temperature of 1340° C. in a press and hot-isostatically formed at this temperature under a pressure of 200 MPa over a 3 hour period. In this process, the ends of the sheets 9 settled on top of each other and in the last phase of this thermomechanical treatment they were firmly welded in the bonding surfaces 10 by diffusion and local deformation. After completion of forming and diffusion-bonding, the inner surface of the workpiece had assumed the shape and dimensions of the mold 1 (internal dimensions):

Width=80 mm
Depth=20 mm

The container 7 was removed by taking off the edges of the narrow sides supporting the beads 8, bending and releasing the container walls and working away the residues.

The mold 1 was removed from the hollow body partly by mechanical and partly by chemical means.

The invention is not restricted to the exemplary embodiments. Other materials than those given in the examples can also be formed and/or bonded by this process. This refers fundamentally to precipitation-hardened and/or dispersion-hardened alloys based on Ni, Co or Fe. Furthermore, preferably sheets or plates of Mo or W or their alloys with or without dispersoids can be worked. The process is also suitable for the forming of plates of ceramic materials (Sialons).

The forming and/or bonding temperatures during hot isostatic pressing should be in the range between 5° C. above the recrystallization temperature and 5° C. below the solidus temperature. For a material in accordance with Example I this means between 1265° C. and 1290° C., and for a material in accordance with Example II between 1320° C. and 1395° C. The pressure should then be in the range between 100 and 200 MPa. The total forming and/or bonding time is preferably 1 to 3 hours.

A suitable container material is a material that is ductile at the forming temperature but still sufficiently strong and without a tendency to form cracks easily when heated and whose melting point is sufficiently above the forming temperature to remain leakproof under all conditions during the entire hot-isostatic pressing operation. Preferably a soft low-carbon non-alloyed or alloyed (e.g. stainless) steel can be used for this purpose. Anti-wetting/separating/lubricating agents are preferably colloidal graphite in water, $Al_2O_3$ or commercial agents, usually based on MgO.

High-temperature alloys, especially nickel or cobalt base alloys and ceramic materials, especially those that can be leached with alkalis, may be used as mold material.

The advantages of the novel process consist of the cost reduction, especially where limited quantities are involved, the possibility of forming complicated workpieces in a single operation, the use of initial material that is already coarse-grained and recrystallized with optimum structure (fringe crystals) for the high-temperature operation and thus the omission of elaborate additional coarse-grain annealing operations.

We claim:

1. A process for the hot forming of at least one sheet (5) made of a material that is difficult to work, using a mold (1) serving as negative form, wherein initially the mold (1) is made of a refractory material, covered at least with one sheet (5) that is to be formed and the whole is placed in a container (2) and tightly welded together under vacuum (6), and the body produced in this way is subjected to a hot-isostatic press process under external pressure from all sides at elevated temperature, at least one sheet (5) being pressed through at least one of the container walls (2) against the contour of the mold (1), and the whole is cooled after the press process and the formed container (7) as well as the mold (1) are removed by chemical and/or mechanical means.

2. The process as claimed in claim 1, wherein the mold (1) is made as a body forming a core and two or more sheets (5) on different sides of the mold (1) are placed at the same time together with the mold into the container (2) and formed simultaneously to make components by hot-isostatic pressing.

3. The process as claimed in claim 2, wherein several sheets (5) are formed simultaneously or in rapid succession in one heat by hot-isostatic pressing and joined together at least in part by diffusion-bonding, such that a monolithic workpiece is produced.

4. The process as claimed in any one of the preceding claims, wherein the temperature is set during hot-isostatic pressing and/or diffusion-bonding at least 5° C. above the recrystallization temperature and at least 5° C. below the solidus temperature of the material to be formed and the pressure is between 100 and 200 MPa and the total forming and/or bonding time is between 1 hour and 3 hours.

5. The process as claimed in claim 4, wherein the material to be formed is a dispersion-hardened nickel base superalloy with the following composition:

Ni√69 % by weight
Cr=15 % by weight
W=4.0 % by weight
Mo=2.0 % by weight
Al=4.5 % by weight
Ti=2.5 % by weight
Ta=2.0 % by weight
C=0.05 % by weight
B=0.01 % by weight
Zr=0.15 % by weight
$Y_2O_3$=1.1 % by weight and the hot-isostatic pressing is performed in a temperature range between 1265° C. and 1290° C.

6. The process as claimed in claim 4, wherein the material to be formed is a dispersion-hardened nickel base superalloy with the following composition:

Ni=78 % by weight
Cr=20 % by weight
C=0.05 % by weight
Al=0.3 % by weight
Ti=0.5 % by weight
Fe=1.0 % by weight
$Y_2O_3$=1.0 % by weight and the hot-isostatic pressing is performed in a temperature range between 1320° C. and 1395° C.

7. The process as claimed in claim 1 or 2, wherein the material to be formed is molybdenum or a molybdenum alloy, tungsten or a tungsten alloy in each case with or without dispersoids.

8. The process as claimed in claim 1 or 2, wherein the material to be formed is a ceramic material.

* * * * *